April 3, 1962 R. W. BROWN 3,028,182
STOP COLLAR
Filed March 20, 1961 2 Sheets-Sheet 2
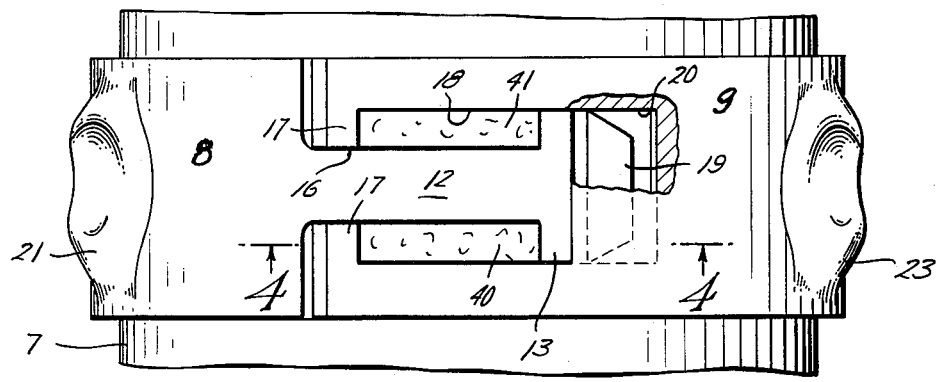
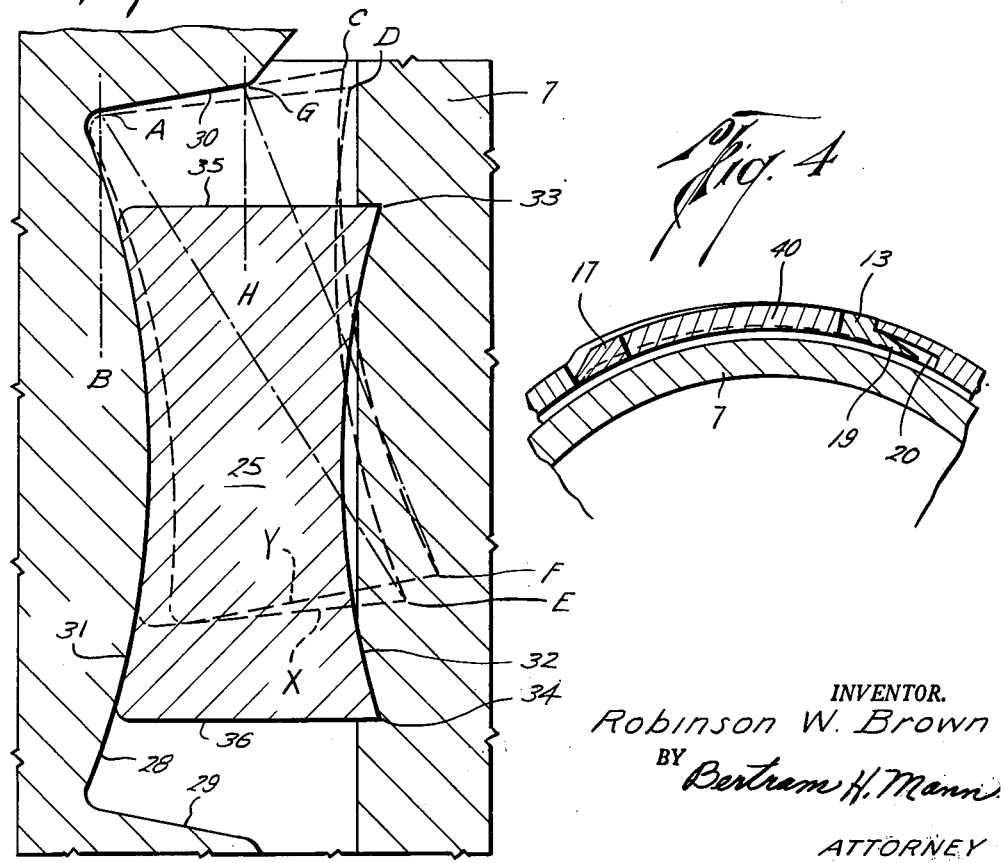
INVENTOR.
Robinson W. Brown
BY Bertram H. Mann
ATTORNEY

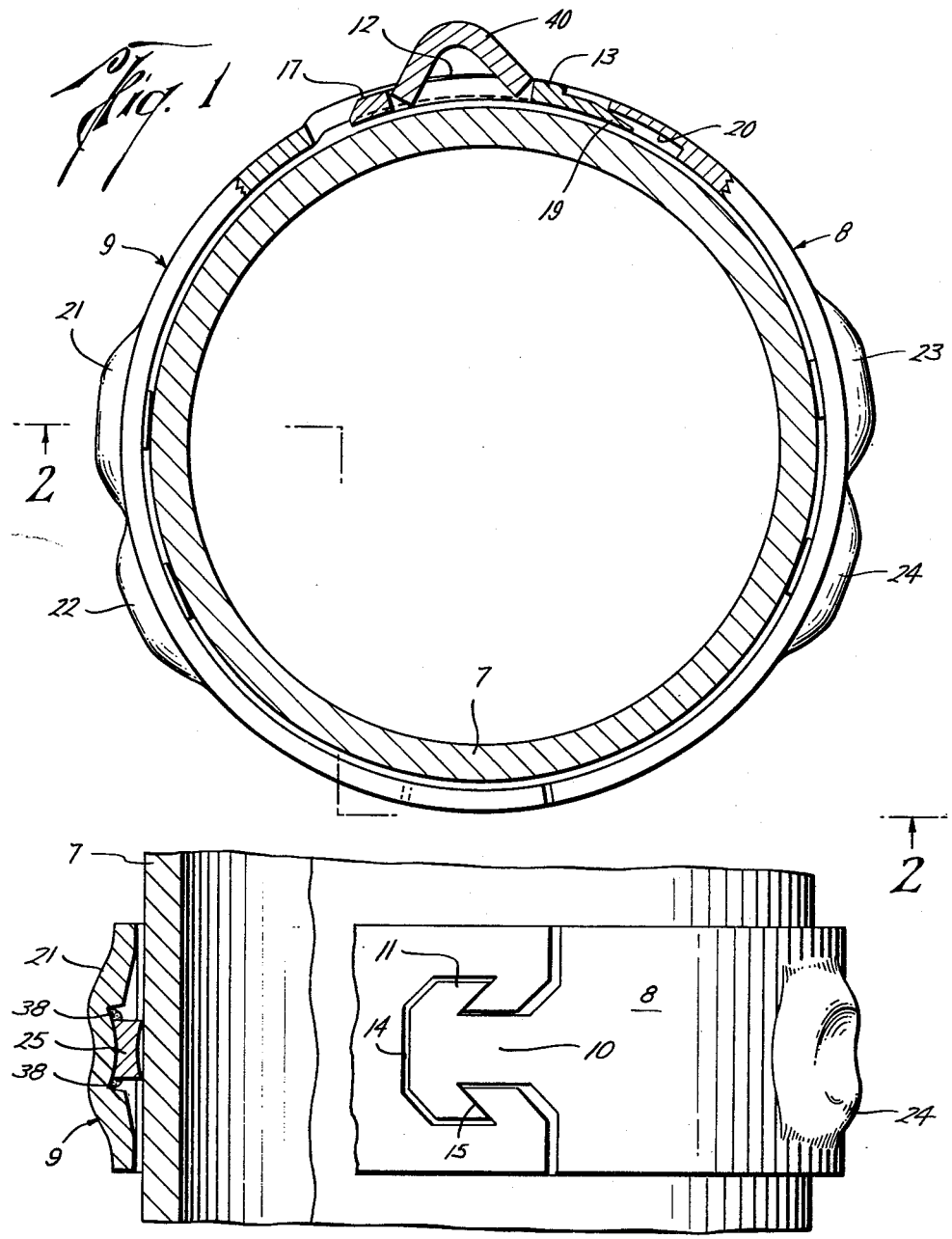

United States Patent Office 3,028,182
Patented Apr. 3, 1962

3,028,182
STOP COLLAR
Robinson W. Brown, San Antonio, Tex., assignor to Weatherford Oil Tool Company, Inc., Houston, Tex., a corporation of Texas
Filed Mar. 20, 1961, Ser. No. 97,020
8 Claims. (Cl. 287—52)

This invention relates to collars or stop devices adapted for firm mounting upon a pipe so as to resist relative movement therebetween.

It is necessary, frequently, to provide limit stops on piping and casing used in oil wells, for instance, to anchor or limit the relative movement of scratchers, centralizers, or the like, mounted on the piping or casing. While many such devices have been provided, none has proved thoroughly satisfactory from the points of view of facility of application, ruggedness, compactness, and strength of adhesion to the mounting pipe when the collar device is subjected to heavy axial or reciprocating loads.

Accordingly, it is an object of the present invention to provide a novel stop collar device which can be readily mounted upon piping or casing, even when lying on racks and which will adhere to the mounting piping under axial loads more strongly than previous devices.

Another object is to provide a stop collar which will firmly adhere to the mounting pipe and which extends radially a minimum distance beyond the pipe.

Another object is to provide a stop collar which will be self-energizing in that its biting adherence to the mounting pipe will be increased as the axial load increases.

Another object is to provide a stop collar device which will firmly adhere to a mounting pipe under opposite or reciprocating axial loads.

Another object is to provide a stop collar device which can be initially set upon a pipe without the necessity of scraping or otherwise cleaning the pipe.

Another object is to provide a stop collar device which will not be damaged even by the application of maximum axial loads encountered, for instance, in oil well work, and which may be removed and reinstalled if desired.

These objects and other more detailed objects hereafter appearing are attained in the novel stop collar herein disclosed which consists of a pair of generally semicircular parts with means for securing the parts together about a pipe or casing with sufficient initial force to set the device for operation. Formed in the inner wall of the device are one or more recesses each having a convex bottom surface upon which slidably seats the conjugate concave surface of a wedging key. The wedging key has one or more eccentric inward biting protuberances positioned such that the rocking of the key upon the mentioned conjugate surfaces, as axial load is applied to the collar device, causes the key to bite further and therefore more firmly into the wall of the casing. Ultimately the force vector between the collar and pipe shift in a manner to reduce the radial and hoop pressures applied to the collar.

In the accompanying drawings which illustrate the invention,

FIG. 1 is a transverse sectional view through a pipe, such as an oil well casing, having the novel stop collar mounted thereon, portions of the collar being broken away and sectioned to better illustrate the underlying structure;

FIG. 2 is a side view and section of the structure in FIG. 1 taken substantially on the line 2—2 thereof;

FIG. 3 is a view of the opposite side of the structure in FIG. 2, but showing the collar tightening keys expanded;

FIG. 4 is a detail section taken substantially on the line 4—4 of FIG. 3; and

FIG. 5 is a largely schematic, enlarged sectional view, similar to the left-hand portion of FIG. 2 and indicating the positioning of a wedging key element under various load conditions.

The collar device is shown mounted upon a pipe or casing 7 and includes, broadly, a pair of generally cylindrical portions 8 and 9. Part 8 has at one end (FIG. 2) a generally arrowhead-shaped tongue 10 with side prongs 11 and, at the other end (FIG. 3) a generally T-shaped tongue 12 with a crosshead 13. Part 9, at one end has a recess 14 with re-entrant side portions, as 15, which rather loosely conforms with tongue portion 10 intended to interfit therewith. At the other end of collar portion 9 there is provided a slot having an outer portion 16 formed by legs 17 and adapted to rather closely receive the shank portion of tongue element 12, and an inner enlarged portion 18 adapted to similarly receive the crosshead portion 13 of tongue 12. Crosshead portion 13 has a tapered edge portion 19, while the adjacent extremity of the opposite collar portion has an accommodating internal recess 20.

Each of collar portions 8 and 9 has a pair of radial bulges, generally designated 21, 22, 23 and 24, with wedging key elements slidably received therein, as at 25 in FIGS. 2 and 5. Since these bulges and wedging key elements are identical, only one set of these will be described in detail. In the present instance, the bulges are arranged in pairs in alignment transversely of the collar and at diametrically opposite positions for equal load distribution.

As best shown in FIG. 5, each of the bulge structures is formed interiorly with a recess having an axially-curved, convex bottom surface 28 and end walls or shoulders 29 and 30. Each wedging element 25 has opposed concave surfaces 31 and 32, the outermost surface 31 corresponding in curvature with bottom surface 28 of the receiving recess. The inner curved surface 32 of the wedging element is of sufficient curvature to form sharp corner protuberances 33 and 34 for biting into the mounting pipe surface. The end walls 35 and 36, in the centered position of the wedging element, as shown in solid lines in FIG. 5, are substantially normal to the axis of the collar and at an angle on the order of 10° with the end or shoulder 30 of the recess. However, when the wedging element has slid along convex surface 28 into engagement with recess shoulder 30, as will be described, the abutting wedge element end wall and recess shoulder form an angle CAD conveniently about 3°. The recess end shoulders 29 and 30 extend inwardly about half the corresponding extent of wedge element end walls 35, 36. When disassembled from a mounting pipe, wedging elements are normally held in centered position within their mounting recesses by fragments of adhesive material, as at 38 in FIG. 2. When assembled on a pipe, expansion keys 40, 41 are applied as shown in FIG. 1 and straightened, as in FIG. 4.

In installing the device on a pipe or casing, collar section 9 is first applied about the pipe and held lightly in position, as by hand. Tongue 10 of section 8 is then hooked into recess 14, 15, and section 8 is then hinged about these parts to complete the encirclement of the pipe and until legs 17 are rather snugly received upon shank 12 and crosshead 13 is similarly received within groove enlargement 18. A light tap of a hammer against part 8 may be necessary for completing this phase of the mounting procedure whereupon the collar will adhere to the pipe.

Next, the bent expansion keys 40 and 41 are inserted in the spaces between groove legs 17 and crosshead 13, as in FIG. 1. These expansion keys are then flattened by hammer blows to the position of FIGS. 3 and 4 to cause the two collar sections to be drawn tightly and securely about the pipe. In this position, wedging key elements will remain centered and the sharpened corners 33 and 34 thereof will bite into the surface of the pipe a slight amount sufficient to be initially lodged in position, as shown in solid line in FIG. 5.

Now, when axial force is applied to either the pipe or collar to cause movement of one relative to the other, each wedging key will slide along its supporting cylindrical surface 28 to first assume the position illustrated at X in FIG. 5 with one of its outer corners, in this case the outer upper corner engaging the recess upper shoulder 30 at the point A, that is, substantially at the base of the shoulder. In reaching this position, the wedging key will be rocked so as to cause its lower sharpened corner E to bite additionally into the metal of the pipe. While the key is illustrated as having shifted upwardly relative to both the pipe and the collar, for simplicity of illustration, in actual practice the key will remain substantially in its initial position on the pipe and there will be relative movement between the pipe and collar. In the X position, the load between the collar device and pipe will be transmitted substantially along the vector line AE, this line, actually, being representative of a cone of force resultant in the complete collar. As the relative axial force applied to the collar continues to increase, the turning moment on the key causes this element to rock further to the position Y of FIG. 5 in which the outer curved surface of the wedge element departs from the concave base of the recess, while the upper end wall of the wedge element assumes a position parallel to and fully in abutment with shoulder 30 of the recess, as represented by line AG. In this ultimate position of the wedge element, the lower corner thereof is forced still further into the metal of the pipe, as at F. However, in this position, axial forces on the collar are now transmitted along the resultant vector FG.

It will be observed that in the ultimate loaded position Y, the angle FGH which vector FG makes with the axis of the collar is substantially less than the angle EAB which force vector EA makes with the axis in initial load position X of the wedge element. Since the tangent of angle FGH is substantially less than the tangent of angle EAB, the radial component of reactive forces applied to the collar in position Y will be correspondingly less, proportionately, than the same forces applied to the collar in the position X. This means that in the initial load position X of the wedging element, adequate radial forces are applied between corner E of the wedge element and the pipe to cause further penetration of the point E from its initial position, as shown in solid line in FIG. 5. Thus, initial increase of axial load on the collar is accompanied by increased adherence of the collar to the pipe. However, further increasing of the axial load on the collar, in transferring the load resultant vector from the line EA to the line FG in substantially reducing the radial load component, also reduces the hoop load on the collar which must be borne by hinging elements 10, 11, and 15. The strength of metal at point G, of course, must be adequate to withstand any sluffing tendency under the loading which the collar must accommodate.

The axial loading on the collar will be equally divided between the four wedging elements provided they are symmetrically arranged. The number of such wedging elements may be varied in accordance with the loading requirements. The wedging elements, as described, are adapted for locking under axial stresses applied to the collar in both directions. However, if the collar is intended to resist axial forces applied in one direction only it would be possible to eliminate one of the sharpened protuberances 33 or 34, the remaining protuberance, being eccentric of the wedging element, being relied upon to increasingly bite into the pipe surface during application of axial forces, as described.

It has been found that the novel wedging structure is adequate for accommodating forces met, for instance, in anchoring centralizers and scratchers to casing in oil wells and in reciprocating such casings for conditioning the wall of the well by scratching action preparatory to cementing. Furthermore, the collar device, even after exposure to extreme load conditions found in practice, may be removed and reapplied. Another important advantage of the device is that it may be easily applied by a single workman and without the necessity of rolling over a casing section mounted on a rack.

The invention may be modified in various respects as will occur to those skilled in the art and exclusive use of all modifications as come within the scope of the appended claims is contemplated.

I claim:

1. A collar device for attachment to a pipe comprising an annular wall and a wedge element slidably engaging said wall and projecting inwardly therefrom, the engaging portions of said wall and said element being, respectively, axially convex and concave for causing tilting of said element when said wall is shifted axially relative to the pipe upon which it is mounted.

2. A collar device as described in claim 1 in which said engaging surfaces are cylindrical and said wedge element has an inward protuberance eccentric relative to its mentioned curved surface for biting into the mounting pipe increasingly as the collar device is loaded axially.

3. A collar device as described in claim 2 in which said wedge element has a pair of gripping protuberances on opposite sides of the radial center line of said engaging surfaces.

4. A collar device for attachment to the exterior of a pipe comprising an annular inner wall having an axially convex part and a wedge element projecting inwardly from said wall and having a conjugal, axially concave surface slidable on said convex part.

5. A collar device for attachment to a pipe comprising an annular inner wall, a recess in said wall having a bottom surface convex axially of said wall and end shoulders, and a wedge element projecting inwardly from said wall and having a concave surface slidably engaging said convex surface, said element, in its centered position in said recess, being spaced from said shoulders and said engaging surfaces causing rocking of said wedge element for embedding the same in the mounting pipe when said annular wall is shifted axially relative to the pipe.

6. A collar device as described in claim 5 in which said end shoulders in said recess provide stops limiting sliding of said wedge element in said recess and for transmitting axial force between the collar device and the mounting pipe.

7. A collar device as described in claim 6 in which each of said end shoulders in said recess extends at an angle away from the end wall of said wedge element facing the same whereby said wedge element may rock away from said convex surface when subjected to increasing axial load.

8. A collar device for attachment to a pipe comprising an annular inner wall, a recess in said wall having an axially convex bottom surface and end shoulders, and a wedge element having a concave surface slidably engaging said convex surface and end walls projecting beyond said end shoulders whereby axial loading of the device relative to a mounting pipe will first cause sliding of said wedge element along said convex surface and consequent rocking of said element to cause further embedding thereof in the mounting pipe, then, when said element abuts one of said shoulders, rocking of said element away from said convex surface to transfer the force resultant line in said element from the base of said last mentioned shoulder to the inner extremity thereof so as to substantially reduce the angle of said force line relative to the axis of the device and, therefore, the radial and hoop forces applied to the device.

References Cited in the file of this patent

UNITED STATES PATENTS

| | | |
|---|---|---|
| 2,134,468 | Bashara | Oct. 25, 1938 |
| 2,718,266 | Berry et al. | Sept. 20, 1955 |
| 2,828,824 | Comstock | Apr. 1, 1958 |
| 2,986,415 | Park | May 30, 1961 |